United States Patent
Cheng

(10) Patent No.: US 7,743,390 B2
(45) Date of Patent: Jun. 22, 2010

(54) DRIVING METHOD OF A DRIVERLESS PERIPHERAL DEVICE WITH A CROSS PLATFORM

(75) Inventor: Mao-Sung Cheng, No. 446, Sec. 2, Jingguo Rd., Hsinchu City 300 (TW)

(73) Assignees: Istek Co., Ltd., Hsinchu County (TW); Mao-Sung Cheng, Hsinchu (TW)

( * ) Notice: Subject to any disclaimer, the term of this patent is extended or adjusted under 35 U.S.C. 154(b) by 1028 days.

(21) Appl. No.: 11/476,715

(22) Filed: Jun. 29, 2006

(65) Prior Publication Data

US 2007/0008582 A1  Jan. 11, 2007

(30) Foreign Application Priority Data

Jul. 5, 2005 (TW) .............................. 94122706 A

(51) Int. Cl.
G06F 13/00 (2006.01)
(52) U.S. Cl. ..................... 719/327; 719/321; 719/322
(58) Field of Classification Search ................ 719/327, 719/321, 322
See application file for complete search history.

(56) References Cited

U.S. PATENT DOCUMENTS

| 6,993,562 | B2 * | 1/2006 | Treptow et al. | 709/206 |
| 2003/0182378 | A1 * | 9/2003 | Treptow et al. | 709/206 |
| 2004/0130744 | A1 * | 7/2004 | Wu et al. | 358/1.15 |
| 2004/0221081 | A1 * | 11/2004 | Yao et al. | 710/302 |
| 2005/0223390 | A1 * | 10/2005 | Moore | 719/321 |
| 2006/0112311 | A1 * | 5/2006 | Cobb | 714/16 |

FOREIGN PATENT DOCUMENTS

| TW | 444182 | 7/2001 |
| TW | 514786 | 12/2002 |
| TW | 556096 | 10/2003 |
| TW | 565768 | 12/2003 |
| TW | 200502844 | 1/2005 |
| TW | I228659 | 3/2005 |

* cited by examiner

*Primary Examiner*—Andy Ho
(74) *Attorney, Agent, or Firm*—Rosenberg, Klein & Lee

(57) ABSTRACT

A driving method of a driverless peripheral device with a cross platform overcomes the inconveniences faced by users of prior art in having to install a driver and/or an application program when a peripheral device is connected with their computer. The present invention utilizes an interface of the homepage stored in a driverless peripheral device for driving the peripheral device with a cross platform. The present invention has the advantages that it doesn't require a driver for any peripheral device, nor an application program. Furthermore, it can execute the necessary operations directly and has cross platform functions.

42 Claims, 6 Drawing Sheets

DRIVING METHOD OF A DRIVERLESS PERIPHERAL DEVICE WITH A CROSS PLATFORM

BACKGROUND OF THE INVENTION

1. Field of the Invention

This invention relates to a driving method of a peripheral device and, more particularly, to a driving method of a driverless peripheral device with a cross platform.

2. Description of the Prior Art

Many novelty peripheral devices have been proposed for providing Plug & Play (PnP) and have a high data transmitting speed, such as Universal Serial Buses (USB) or IEEE 1394 buses. A USB supports 127 peripheral devices for sharing one bandwidth. An IEEE 1394 bus supports 63 peripheral devices. Users can utilize a USB connection port or an IEEE 1394 connection port for connecting peripheral devices to a computer.

A driver stores data in the memory of the peripheral device and the peripheral device utilizes the USB connection port or the IEEE 1394 connection port to install the driver on the computer. The driver is installed on an operating system of the computer so that the operating system can support the peripheral device when the peripheral device connects to the computer via the USB connection port or the IEEE 1394 connection port.

TW patent no. 444182 proposed an "Automatic installation method for a personal computer driver". This patent utilizes a CD-ROM to automatically install a driver on the computer. The CD-ROM stores many drivers and a management program. The management program detects the type of operating system and installs drivers on the computer. This patent has the disadvantage of requiring a driver, requiring installation of an application program, and lacks cross platform functions. Also, its compatibility is poor.

TW patent no. 514786 proposed a "Processing method and computer system for a driver in an intelligent peripheral device". This patent proposes an application program of a processing method and a computer system for a driver in an intelligent peripheral device lacking a vendor driver. The method has a universal driver that includes all current peripheral device drivers. The universal driver installs the driver in accordance with the peripheral device's serial number. It is different in implement on the current operating system because the universal driver lacks the latest novelty peripheral device driver. So the new driver may be installed on the computer when there is a novelty peripheral device connected to the computer. The disadvantage of this design is that it requires a driver, it lacks cross platform functions, and its compatibility is poor.

TW patent no. 556096 proposed an "Installation method for a driver of a Plug-and-Play device". This patent proposes a driver for a built-in Plug-and-Play device for providing load on a server. The server loads the driver of the Plug-and-Play device and controls the Plug-and-Play device when the server recognizes the Plug-and-Play device. The disadvantage of this design is that it requires a driver, lacks cross platform functions and its compatibility is poor.

TW patent no. 565768 proposed "A network peripheral device without a pre-install driver". This patent proposes a user directly clicks an icon of the peripheral device in a web browser without pre-installing a driver on a remote computer. This design doesn't require the user to insert a disk or a CD-ROM and update the driver. The disadvantage of this design is that it still requires a driver to be installed, lacks cross platform functions and its compatibility is poor.

TW patent no. 1228659 proposed a "Plug and Play electronic product and driving method thereof". The plug and play electronic product is pulled out of the first electronic product. Then, the plug and play electronic product is reconnected to the first electronic product and driven by the first driver to simulate at least a second transmission port. The disadvantage of this design is that it requires a driver and its compatibility is poor.

TW patent no. 200502844 proposed "A peripheral device having a USB disk store driver and a driving method". This patent utilizes the hub concept to store drivers and application programs via a USB. The disadvantage of this design is that it requires a driver, lacks cross platform functions and its compatibility is poor.

SUMMARY OF THE INVENTION

To solve the above problems, it is an object of the present invention to provide a driving method for a peripheral device with a cross platform. The driving method and cross platform make the driver of the peripheral device unnecessary.

The present invention proposes a driving method for a driverless peripheral device with a cross platform. The peripheral device utilizes an expansion interface port connected to a computer. The method includes the steps of: linking the peripheral device to the expansion interface port; simulating a link icon of the peripheral device in accordance with the expansion interface port and showing the link icon on a desktop of the operating system of the computer; clicking the link icon and opening an a homepage stored in the peripheral device; loading the homepage onto the memory of the computer; and executing the interface of the homepage for controlling the peripheral device.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE INVENTION

Figure 1:
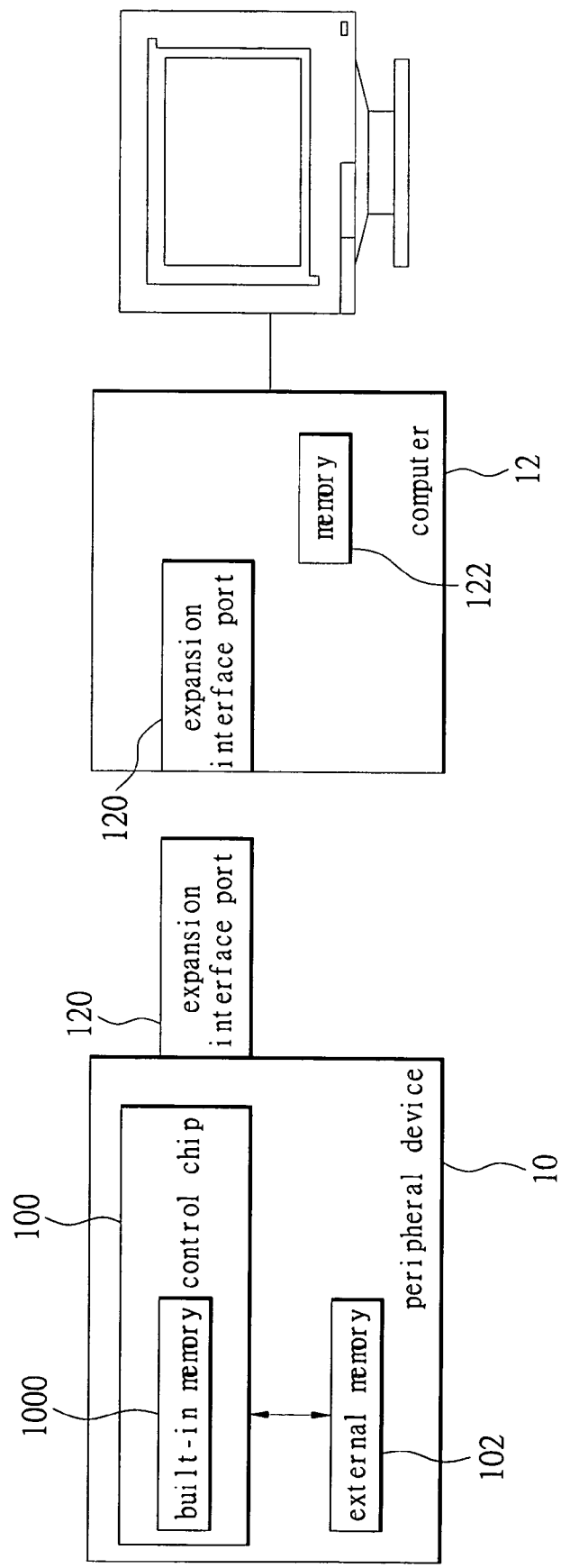
FIG. 1 is a system diagram according to the present invention.
Figure 2:
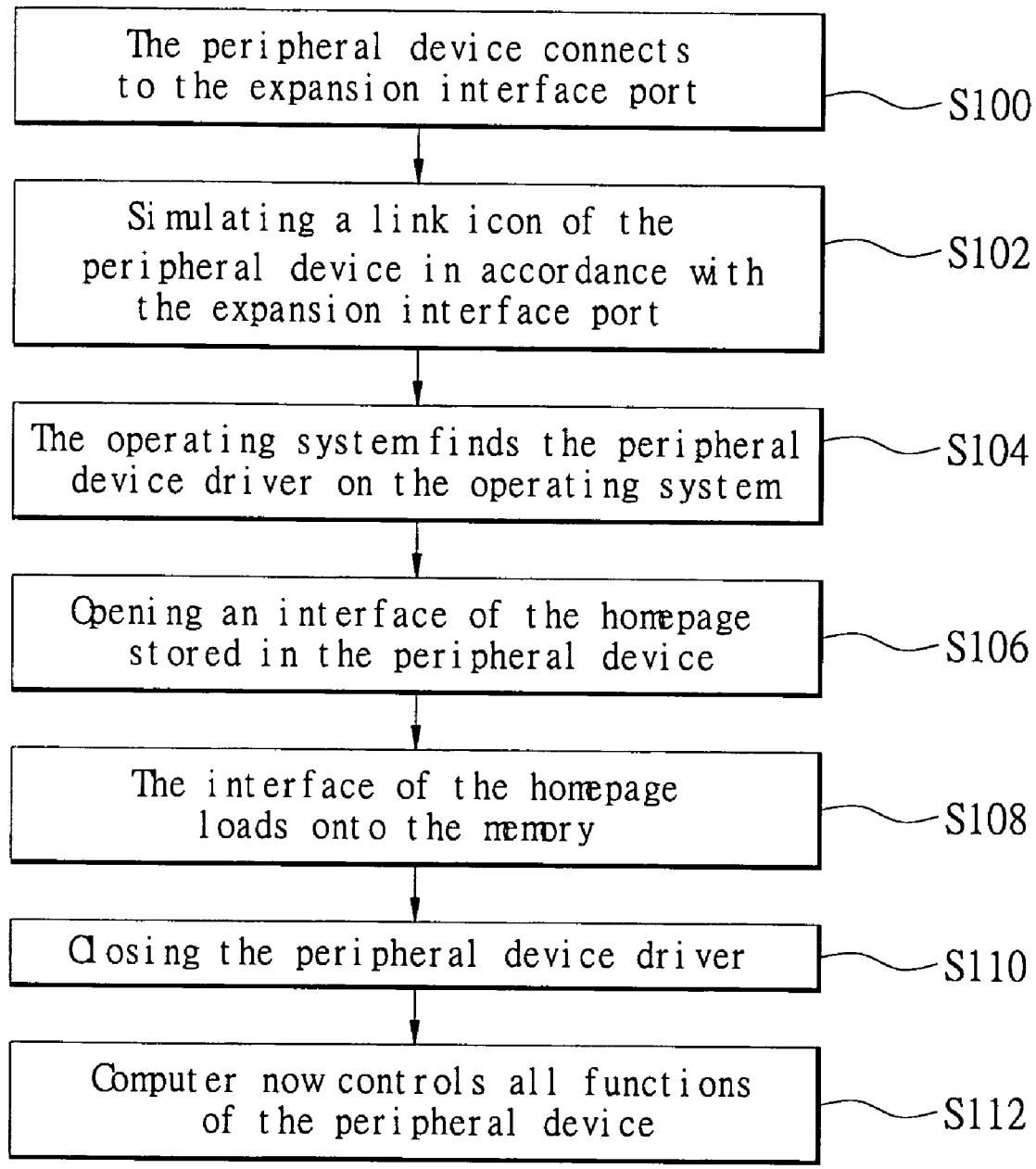
FIG. 2 is a flow chart of a driving method of a driverless peripheral device with a cross platform according to the present invention.

Referring to FIG. 1 is a system diagram of the present invention. FIG. 2 is a flow chart of a driving method of a driverless peripheral device with a cross platform.

Referring to FIG. 1 and FIG. 2, the peripheral device 10 utilizes an expansion interface port 120 connected to a computer 12. The method is comprised of the steps of the peripheral device 10 connecting to the expansion interface port 120 (S100). The expansion interface port 120 may be a USB port, an IEEE 1394 port or a PCI and derivational bus port (such as a PCI-X or a PCI Express, etc). Next, simulating a link icon of the peripheral device 10 in accordance with the expansion interface port 120 and showing the link icon on a desktop of an operating system of the computer 12 (S102). The link icon is a built-in icon of the peripheral device that is supported by the operating system, such as a disk icon, a CD-ROM icon, a printer icon, or a web camera icon, etc. The operating system can be a Windows® series (such as Windows 95, Windows 98, Windows NT, Windows 2000 or Windows XP), a Linux® series (such as Redhat® Linux or FreeBSD® Linux) or a MAC® series. The operating system of the above-mentioned includes built-in kinds of peripheral device drivers and expansion interface port drivers. Simulating utilizes this feature of the operating system that the peripheral device 10 connects to the computer 12. Next, the operating system finds the peripheral device 10 driver on the operating system and drives the functions of the peripheral device 10 (S104).

A user then clicks the link icon through the expansion interface port 120 to open an interface of the homepage stored in the peripheral device 10 (S106). The homepage is produced by a cross platform program language, the cross platform program may be a JAVA program language, a web editing program language (such as HTML, FrontPage, etc) or a network 3D program language (such as Flash). The interface of the homepage is stored in a memory of the peripheral device 10, and the memory may be a built-in memory 1000, or an external memory 102. The built-in memory 1000 should be embedded on a control chip 100 (such as an SOC). The external memory 102 electronically connects with the control chip 100. The external memory 102 may be a non-volatile (such as ROM or Flash).

The interface of the homepage loads onto a memory 122 of the computer 12 (S108). Step S108 utilizes a multitasking mode to load the interface of the homepage onto the memory 122 of the computer 12, wherein the multitasking mode is changed between a command mode and/or a homepage mode. The memory 122 may be a non-volatile memory or a volatile memory. The code of the homepage loads onto a memory address corresponding to the memory 122 via the expansion interface port 120. The memory address depends on the writing code of the homepage. Next, the peripheral device 10 driver is closed when the code of the homepage has loaded completely onto the memory 122 of the computer 12 (S110). The computer 12 can now control all functions of the peripheral device 10 via the interface of the homepage (S112).

Figure 3:
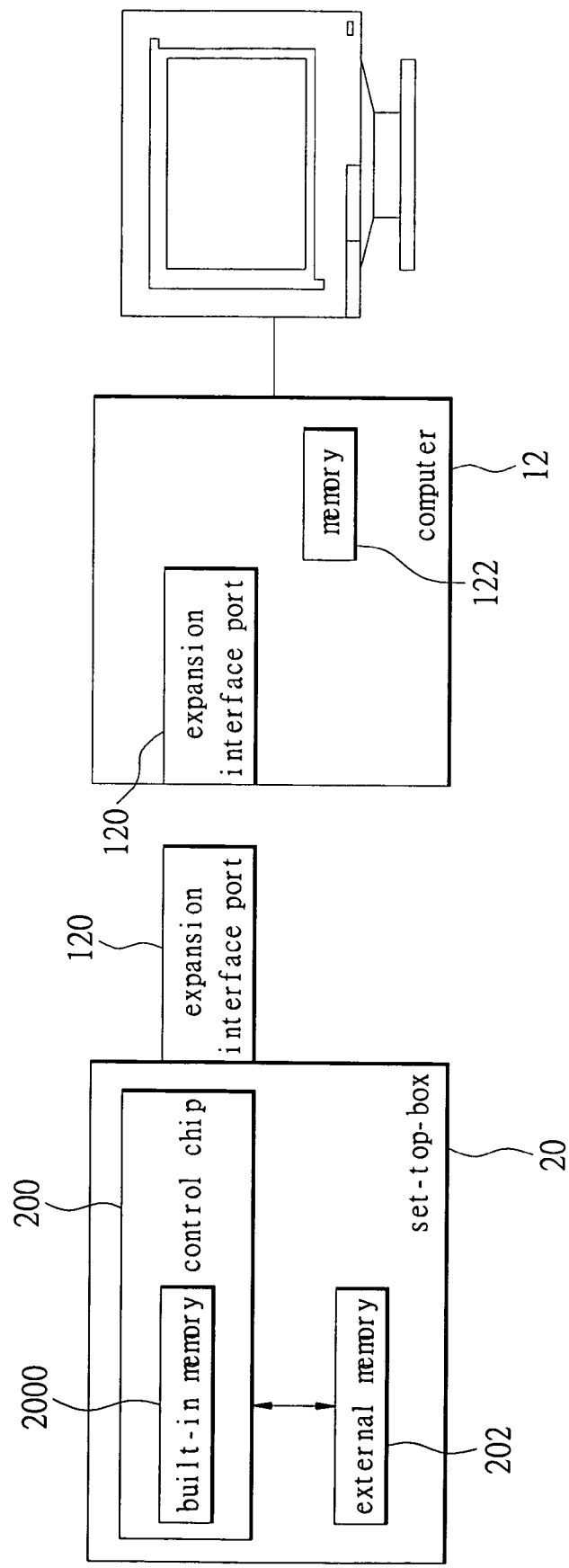
FIG. 3 is a set-top-box system diagram of the first embodiment according to the present invention.
Figure 4:
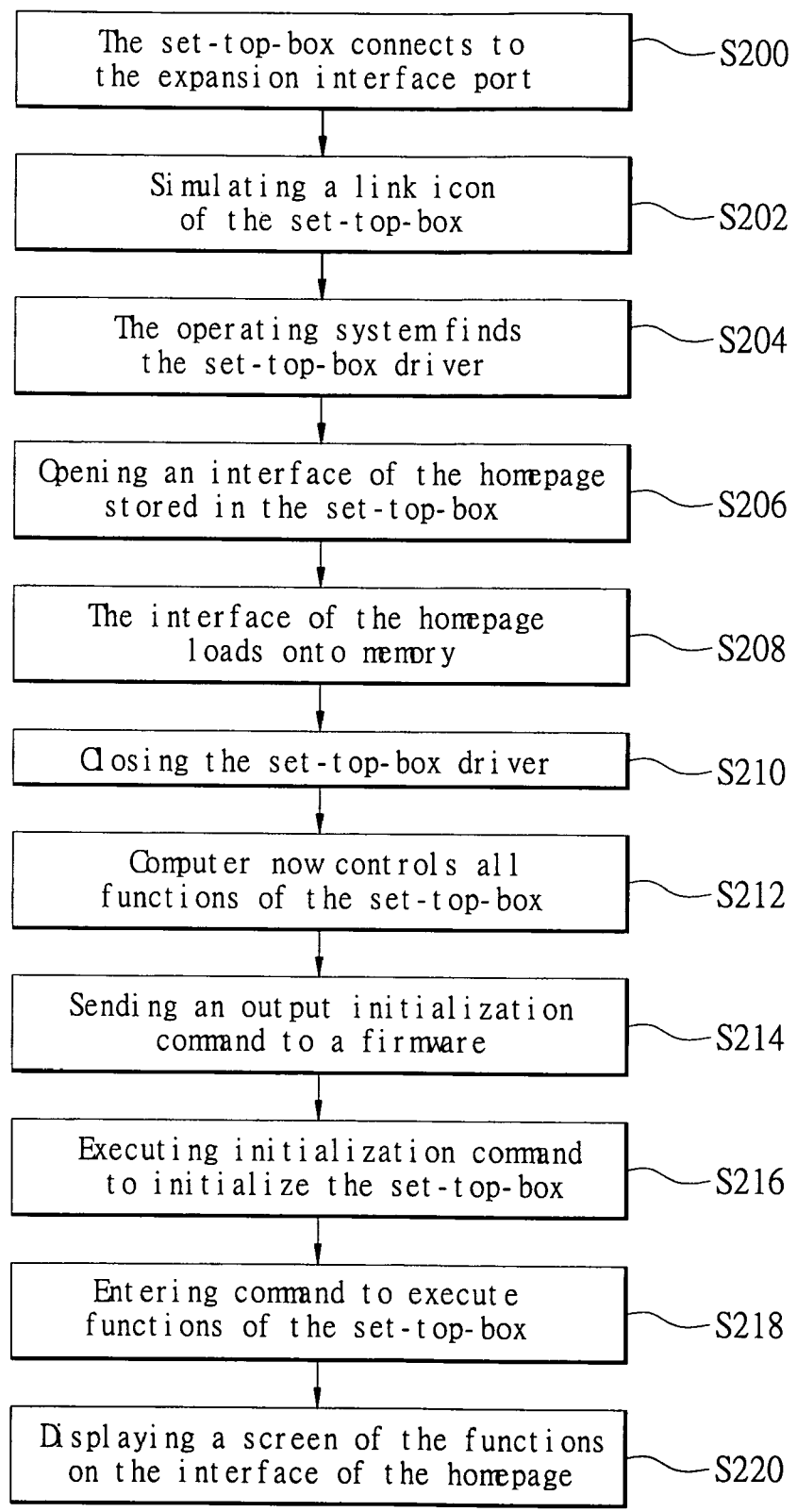
FIG. 4 is a flow chart of the first embodiment of a driving method of a set-top-box with a cross platform according to the present invention.

In FIG. 3, a set-top-box system diagram of the first embodiment in accordance with the present invention is shown. In FIG. 4, a flow chart of the first embodiment of a driving method of a driverless set-top-box with a cross platform in accordance with the present invention is shown. In FIG. 3, only some of the components of the set-top-box are shown. A person skilled in the relevant art will recognize that other components and configurations can be used without parting from the spirit and scope of the first embodiment of the present invention. The first embodiment of the present invention provides a driving method of a driverless set-top-box with a cross platform. The set-top-box 20 utilizes an expansion interface port 120 connected to a computer 12, the method comprises the steps of the set-top-box 20 connects to the expansion interface port 120 (S200). The expansion interface port 120 may be a USB port, an IEEE 1394 port or a PCI and derivational bus port (such as a PCI-X or a PCI Express etc). Next, simulating a link icon of the set-top-box 20 in accordance with the expansion interface port 120 and showing the link icon of the set-top-box 20 on a desktop of an operating system of the computer 12 (S202). The link icon is a built-in icon of the peripheral device that is supported by the operating system, such as a disk icon, a CD-ROM icon, a printer icon, or a web camera icon, etc. The operating system can be a Windows® series (such as Windows 95, Windows 98, Windows NT, Windows 2000 or Windows XP), a Linux® series (such as Redhat® Linux or FreeBSD® Linux) or a MAC® series. The above-mentioned operating system includes built-in kinds of peripheral device drivers and expansion interface port drivers. Simulating utilizes a feature of the operating system that connects the set-top-box 20 to the computer 12. Next, the operating system finds the set-top-box 20 driver on the operating system and drives the functions of the set-top-box 20 (S204). Next, the user clicks the link icon through the expansion interface port 120 to call an interface of the homepage stored in the set-top-box 20 (S206). The interface of the homepage is produced by a cross platform program language. The cross platform program may be a JAVA program language, a web editing program language (such as HTML, FrontPage, etc) or a network 3D program language (such as Flash). The interface of the homepage is stored in a memory of the set-top-box 20, and the memory may be a built-in memory 2000, or an external memory 202. The built-in memory 2000 should be embedded on a control chip 200 (such as an SOC). The external memory 202 electronically connects to the control chip 200. The external memory 202 may be a non-volatile (such as ROM or Flash).

The interface of the homepage loads onto a memory 122 of the computer 12 (S208). S108 utilizes a multitasking mode to load the interface of the homepage onto the memory 122 of the computer 12, wherein the multitasking mode is changed between a command mode and/or a homepage mode. The memory 122 may be a non-volatile memory or a volatile memory. The code of the homepage loads onto a memory address corresponding to the memory 122 via the expansion interface port 120. The memory address depends on the code of the homepage writing. The set-top-box 20 driver is closed when the code of the homepage has load completely onto the memory of the computer 12 (S210). The computer 12 can now control all the functions of the set-top-box 20 via the interface of the homepage (S212).

The interface of the homepage outputs an initialization command to a firmware stored in a memory 2000, 202 of the set-top-box 20 (S214). The initialization command is executed to initialize the set-top-box 20 (S216). The initialization command follows a code inside the firmware for initialing the set-top-box 20. The initialization command includes an adjustment for receiving signals, and searching digital channels and peripheral IC components of the set-top-box 20. A plurality of commands are entered through the interface of the homepage to execute a plurality of functions of the set-top-box 20 corresponding to the commands (S218). The functions comprise: catching signals, choosing a direction, adjusting a brightness, choosing a channel, and adjusting volume and contrast. A plurality of function screens are then displayed on the interface of the homepage (S220).

Figure 5:
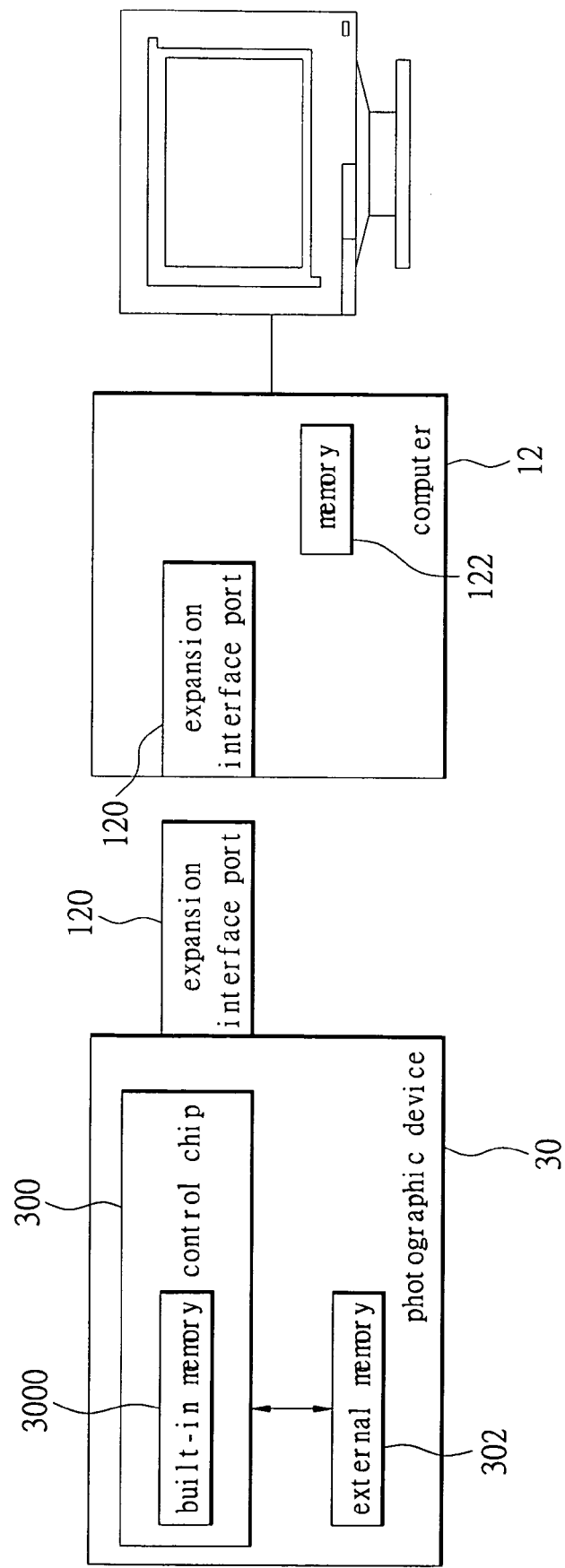
FIG. 5 is a photographic device system diagram of the second embodiment according to the present invention.
Figure 6:
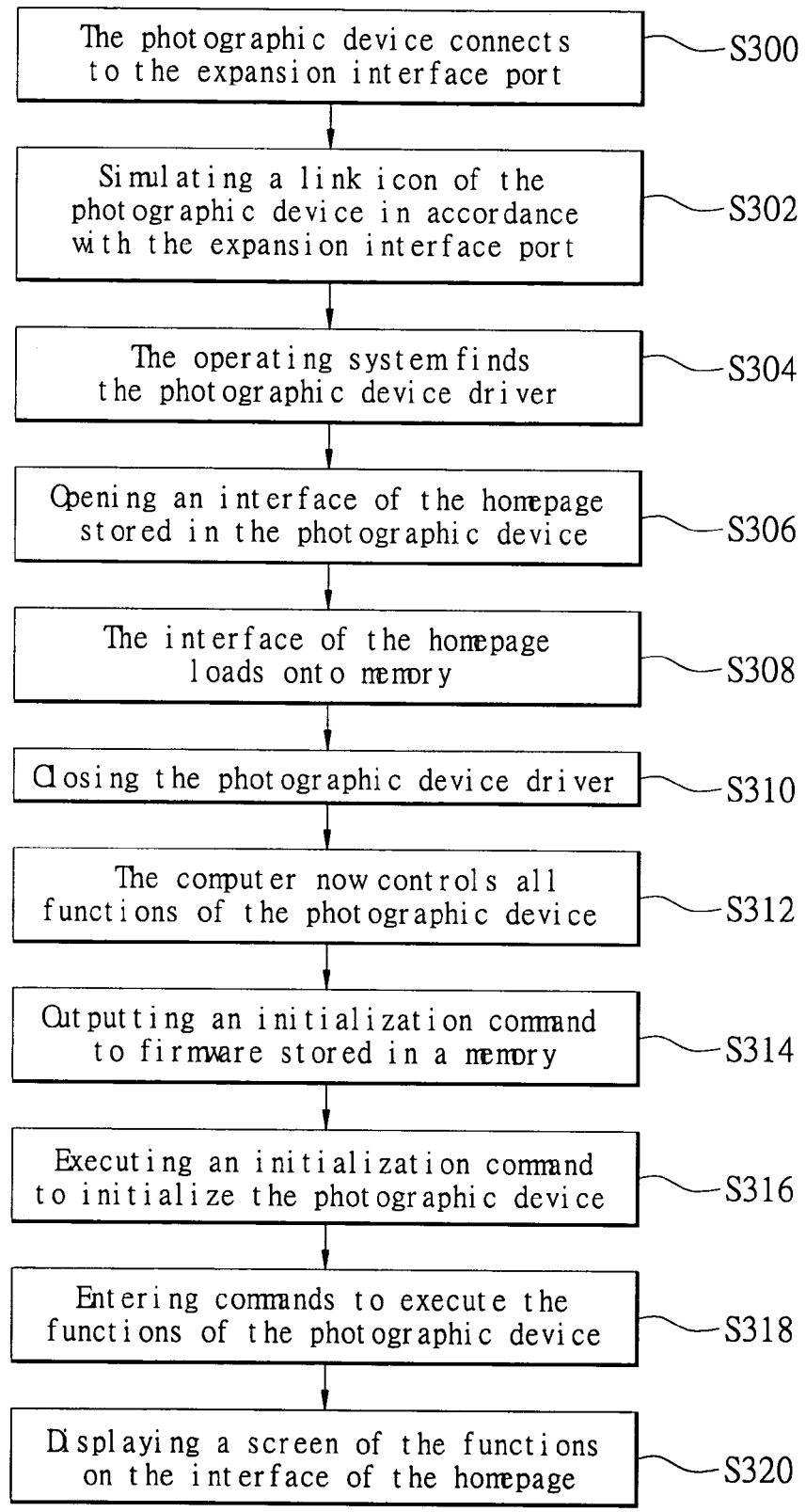
FIG. 6 is a flow chart of the second embodiment of a driving method of a driverless photographic device with a cross platform according to the present invention.

Referring to FIG. 5, a photographic device system diagram of the second embodiment in accordance with the present invention is shown. Referring to FIG. 6, a flow chart of the second embodiment of a driving method of a driverless photographic device with a cross platform in accordance with the present invention is shown. In FIG. 5, only some of the components of the photographic device are shown. A person skilled in the relevant art will recognize that other components and configurations can be used without parting from the spirit and scope of the first embodiment of the present invention. The first embodiment of the present invention provides a driving method of a driverless photographic device with a cross platform, the photographic device 30 utilizes an expansion interface port 120 connected to a computer 12.

The method comprises: connecting the photographic device 30 to the expansion interface port 120 (S300). The expansion interface port 120 may be a USB port, an IEEE 1394 port or a PCI and derivational bus port (such as a PCI-X or a PCI Express etc). Next, simulating a link icon of the photographic device 30 in accordance with the expansion interface port 120 and showing the link icon of the photographic device 30 on a desktop of an operating system of the computer 12 (S302). The link icon is a built-in icon of the peripheral device that is supported by the operating system, such as a disk icon, a CD-ROM icon, a printer icon or a web camera icon etc. The operating system can be a Windows® series (such as Windows 95, Windows 98, Windows NT, Windows 2000 or Windows XP), a Linux® series (such as Redhat® Linux or FreeBSD® Linux) or a MAC® series. The operating system of the above-mentioned includes built-in kinds of peripheral device drivers and expansion interface port drivers. Simulating utilizes this feature of the operating system so that the photographic device 30 connects to the computer 12. Next, the operating system finds the photographic device 30 driver on the operating system and drives the functions of the photographic device 30 (S304).

Next, a user clicks the link icon through the expansion interface port 120 for opening an interface of the homepage stored in the photographic device 30 (S306). The interface of the homepage is produced by a cross platform program language. The cross platform program may be a JAVA program language, a web editing program language (such as HTML, FrontPage, etc) or a network 3D program language (such as Flash). The interface of the homepage is stored in a memory of the photographic device 30, and the memory may be a built-in memory 3000, or an external memory 302. The built-in memory 3000 should be embedded on a control chip 300 (such as an SOC). The external memory 302 electronically connects to the control chip 300. The external memory 302 may be a non-volatile (such as ROM or Flash).

The interface of the homepage loads onto a memory 122 of the computer 12 (S308). S108 utilizes a multitasking mode to load the interface of the homepage onto the memory 122 of the computer 12, wherein the multitasking mode is changed between a command mode and/or a homepage mode. The memory 122 may be a non-volatile memory or a volatile memory. The code of the homepage loads onto a memory address corresponding to the memory 122 via the expansion interface port 120. The memory address depends on the code of the homepage writing. The photographic device 30 driver is closed when the code of the homepage has loaded completely onto the memory of the computer 12 (S310). The computer 12 now controls all functions of the photographic device 30 via the interface of the homepage (S312).

The interface of the homepage outputs an initialization command to a firmware stored in a memory 3000, 302 of the photographic device 30 (S314). The initialization command is executed to initialize the photographic device 30 (S316). The initialization command follows a code inside the firmware for initialing the photographic device 30. A plurality of commands are entered through the interface of the homepage to execute a plurality of functions of the photographic device 30 corresponding to the commands (S318). The functions comprise: catching signals, choosing a direction, adjusting the brightness, choosing a channel, adjusting the volume voice and contrast. A plurality of function screens are then displayed on the interface of the homepage (S320).

The peripheral device of the present invention should not be limited by the above-mentioned embodiments. The method of the present invention uses the expansion interface port supported by an operating system (including a Windows® series, a Linux® series or a MAC® series). The peripheral device can include a printer, a multi-function printer, a digital camera, a set-top-box, a photographic device or other electronic products. The above-mentioned peripheral devices can use the present invention for linking and driving.

Comparing the present invention and the prior art, the present invention has the advantage of not requiring a driver for any peripheral device, nor any application programs. It can be directly executed and has cross platform functions. The present invention does not require a driver to be installed to any peripheral device, regardless of the kind of peripheral device when the peripheral device stores the interface of the homepage. Currently, the operating system (includes a Windows® series, a Linux® series or a MAC® series) supports any homepage display function. The present invention achieves its cross platform objective, and reduces the memory size of the peripheral device because the interface of the homepage only requires a small memory size.

However, in the description mentioned above, only the preferred embodiments according to this invention are provided without limit to claims of this invention; all those skilled in the art without exception should include the equivalent changes and modifications as falling within the true scope and spirit of the present invention.

What is claimed is:

1. A driving method of a driverless peripheral device with a cross platform, the peripheral device utilizes an expansion interface port connected to a computer, comprising:
   linking the peripheral device to the expansion interface port;
   simulating a link icon of the peripheral device in accordance with the expansion interface port and showing the link icon on a desktop of an operating system of the computer;
   clicking the link icon and opening an a homepage stored in the peripheral device;
   loading the homepage onto a memory of the computer; and
   executing the homepage for controlling the peripheral device.

2. The method according to claim 1, wherein the expansion interface port is a USB port, an IEEE 1394 port or a PCI and derivational bus port.

3. The method according to claim 1, wherein the link icon is a disk icon or a CD-ROM icon.

4. The method according to claim 1, wherein the operating system is a Windows® series, a Linux® series or a MAC®.

5. The method according to claim 1, wherein simulating a link icon further comprises starting a driver of the link icon supported by the operating system.

6. The method according to claim 1, wherein the interface of the homepage is stored in a memory of the peripheral device.

7. The method according to claim 6, wherein the memory is a built-in memory or an external memory.

8. The method according to claim 1, wherein the interface of the homepage is produced by a cross-platform program language.

9. The method according to claim 1, wherein the memory is a non-volatile memory or a volatile memory.

10. The method according to claim 1, wherein the step of loading the interface of the homepage further comprises closing a driver of the link icon supported by the operating system.

11. The method according to claim 1, wherein the interface of the homepage is a multitasking mode.

12. The method according to claim 11, wherein the multitasking mode changes between a command mode and/or a homepage mode.

13. A driving method of a driverless set-top-box with a cross platform, the set-top-box utilizes an expansion interface port connected to a computer, comprising:
   linking the set-top-box to the expansion interface port;
   simulating a link icon of the set-top-box in accordance with the expansion interface port and showing the link icon on a desktop of an operating system of the computer;
   clicking the link icon and opening an interface of the homepage stored in the set-top-box;
   loading the interface of the homepage onto a memory of the computer;
   executing the interface of the homepage for controlling the set-top-box;
   outputting an initialization command of the interface of the homepage to a firmware stored in the set-top-box; and
   entering a plurality of commands through the interface of the homepage to execute a plurality of functions of the set-top-box corresponding to the commands.

14. The method according to claim 13, wherein the expansion interface port is a USB port, an IEEE 1394 port or a PCI and derivational bus port.

15. The method according to claim 13, wherein the link icon is a disk icon or a CD-ROM icon.

16. The method according to claim 13, wherein the operating system is a Windows® series, a Linux® series or a MAC®.

17. The method according to claim 13, wherein simulating a link icon further comprises starting a driver of the link icon supported by the operating system.

18. The method according to claim 13, wherein the interface of the homepage is stored in a memory of the set-top-box.

19. The method according to claim 18, wherein the memory is a built-in memory or an external memory.

20. The method according to claim 13, wherein the interface of the homepage is produced by a cross-platform program language.

21. The method according to claim 13, wherein the step of loading the interface of the homepage further comprises closing a driver of the link icon supported by the operating system.

22. The method according to claim 13, wherein the interface of the homepage is a multitasking mode.

23. The method according to claim 22, wherein the multitasking mode is changed between a command mode and/or a homepage mode.

24. The method according to claim 13, wherein the firmware is stored in a memory of the set-top-box.

25. The method according to claim 13, where the step of outputting an initialization command further comprises executing the initialization command to initialize the set-top-box.

26. The method according to claim 13, wherein the functions include catching signals, choosing a direction, adjusting a brightness, choosing a channel, adjusting a volume and contrast.

27. The method according to claim 13, wherein the step of entering a plurality of commands further comprises displaying a plurality of screens of the functions on the interface of the homepage.

28. A driving method of a driverless photographic device with a cross platform, the photographic device utilizes an expansion interface port connected to a computer, comprising:
   linking the photographic device to the expansion interface port;
   simulating a link icon of the photographic device in accordance with the expansion interface port and showing the link icon on a desktop of an operating system of the computer;
   clicking the link icon and opening an interface of a homepage stored in the photographic device;
   loading the interface of the homepage onto a memory of the computer;
   executing the interface of the homepage for controlling the photographic device;
   outputting an initialization command of the interface of the homepage to a firmware stored in the photographic device; and
   entering a plurality of commands through the interface of the homepage to execute a plurality of functions of the photographic device corresponding to the commands.

29. The method according to claim 28, wherein the expansion interface port is a USB port, an IEEE 1394 port or a PCI and derivational bus port.

30. The method according to claim 28, wherein the link icon is a disk icon or a CD-ROM icon.

31. The method according to claim 28, wherein the operating system is a Windows® series, a Linux® series or a MAC®.

32. The method according to claim 28, wherein simulating a link icon further comprises starting a driver of the link icon supported by the operating system.

33. The method according to claim 28, wherein the interface of the homepage is stored in a memory of the photographic device.

34. The method according to claim 33, wherein the memory is a built-in memory or an external memory.

35. The method according to claim 28, wherein the interface of the homepage is produced by a cross-platform program language.

36. The method according to claim 28, wherein the step of loading the interface of the homepage further comprises closing a driver of the link icon supported by the operating system.

37. The method according to claim 28, wherein the interface of the homepage is a multitasking mode.

38. The method according to claim 37, wherein the multitasking mode is changed between a command mode and/or a homepage mode.

39. The method according to claim 28, wherein the firmware is stored in a memory of the photographic device.

40. The method according to claim 28, where the step of outputting an initialization command further comprises executing the initialization command to initialize the photographic device.

41. The method according to claim 28, wherein the functions include catching signals, choosing a direction, adjusting a brightness, choosing a channel, adjusting a volume and contrast.

42. The method according to claim 28, wherein the step of entering a plurality of commands further comprises displaying a plurality of screens of the functions on the interface of the homepage.

* * * * *